United States Patent [19]

Farque et al.

[11] 4,251,950
[45] Feb. 24, 1981

[54] ELECTRONIC SILVICIDAL APPARATUS

[75] Inventors: Anthony Farque, Fayetteville, Ark.; Doyle Nutt, 414 Oakwood, Fayetteville, Ark. 72701

[73] Assignee: Doyle Nutt, Fayetteville, Ark.

[21] Appl. No.: 155,402

[22] Filed: Jun. 2, 1980

[51] Int. Cl.³ .......................................... A01M 21/00
[52] U.S. Cl. ........................................ 47/1.3; 47/58
[58] Field of Search ........................... 47/1.3, 1.43, 58

[56] References Cited

U.S. PATENT DOCUMENTS

| | | | |
|---|---|---|---|
| 2,007,879 | 7/1935 | Sefton | 47/1.3 |
| 3,935,670 | 2/1976 | Pluenneke et al. | 47/1.3 |

FOREIGN PATENT DOCUMENTS

| | | | |
|---|---|---|---|
| 79330 | 7/1950 | Czechoslovakia | 47/1.3 |
| 542868 | 5/1956 | Italy | 47/1.3 |

*Primary Examiner*—Robert E. Bagwill
*Attorney, Agent, or Firm*—Robert R. Keegan

[57] ABSTRACT

There is disclosed electronic apparatus for devitalizing a band of cells girdling a tree trunk to cause the death of an unwanted tree or other plant, including a source of radio-frequency energy, and first and second r.f. electrical couplers to the stem or trunk of the plant or tree; preferably such couplers are flexible chains or the like and are caused to encircle the tree by a first actuator which closes jaws of a portable portion of the apparatus around the tree and a second actuator which draws the flexible couplers snug against the trunk of the tree. Death of the plant is believed caused primarily by devitalization of a band of cells girdling the stem of the plant and in particular the cambium cell layers are devitalized by being elevated in temperature by dielectric heating or induction heating effects.

12 Claims, 5 Drawing Figures

U.S. Patent  Feb. 24, 1981  Sheet 1 of 3  4,251,950
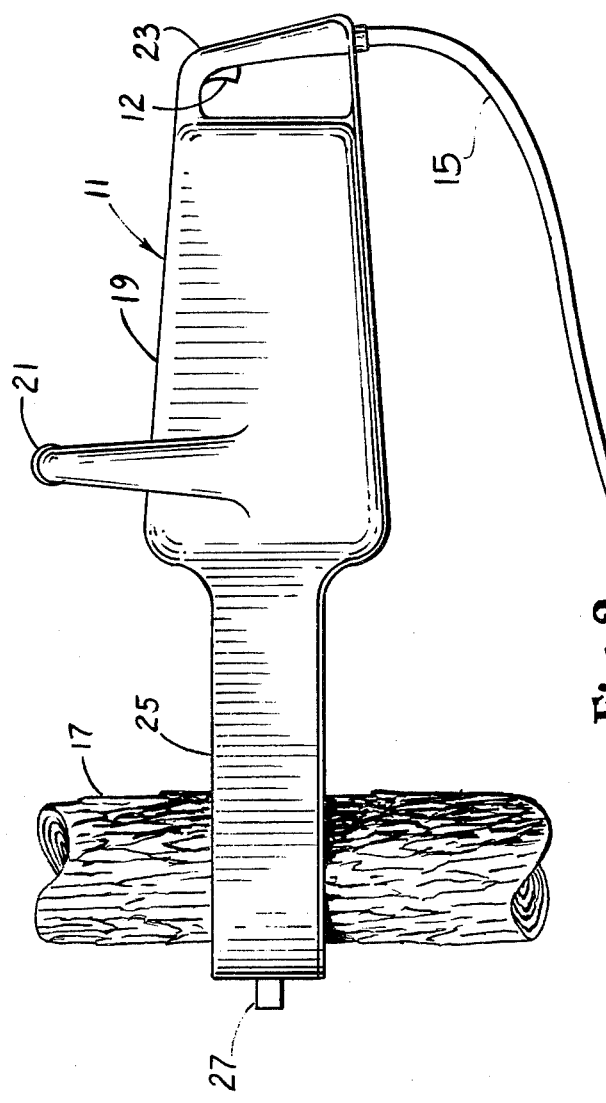
Fig. 2
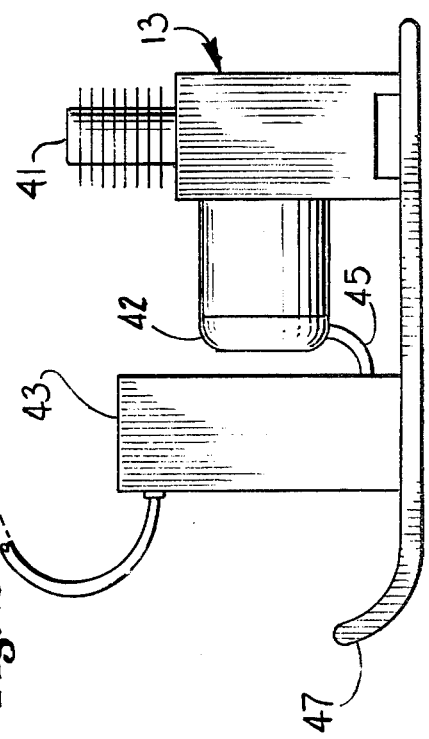
Fig. 1
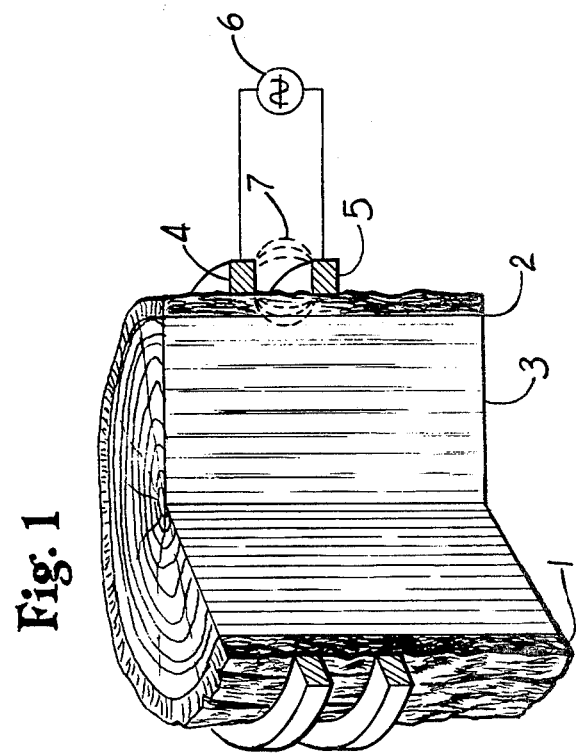

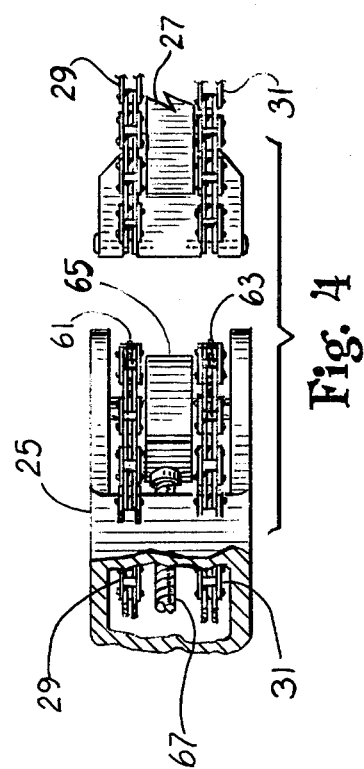
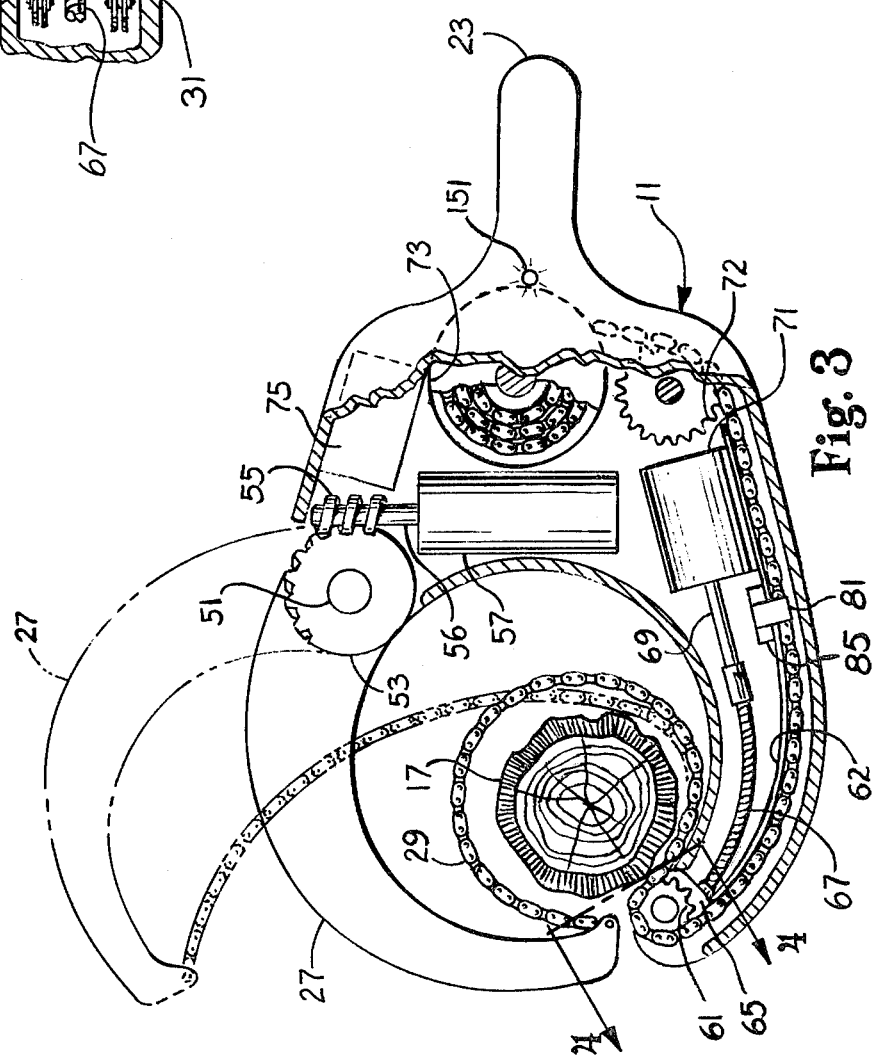

ELECTRONIC SILVICIDAL APPARATUS

The present invention relates to an apparatus for killing trees or brush which are creating a problem in forestry operations or are required to be removed from roadsides, utility rights-of-way, or the like. The present apparatus is an alternative to physically cutting and felling the tree or girdling and/or chemically treating the plants to cause their death. The present electronic apparatus may be utilized in a situation in which the dead plant is later to be removed or in cases where it is to be allowed to remain (for wild-life conservation, for example).

Conventional forestry practices for killing unwanted trees often involved physically girdling the tree with an axe or other cutting tool and applying chemical into the girdling cut to destroy vital organic processes of the tree. In other cases chemical spraying processes on plant foliage is relied upon to destroy unwanted large plant life. With improved understanding of the deleterious effect of chemicals on the environment it has become apparent that a technique for killing unwanted trees is needed in which chemicals play no part. The term silvicidal apparatus is used herein to describe apparatus for the killing of trees or other large plants without use of chemicals.

The control of vegetative growth is an on-going day-to-day requirement for telephone, gas, and power companies seeking to ensure safety and access along their rights-of-way. Highway departments, railroads and air transportation operations also need to kill trees interferring with their operations. Farmers of food and fiber crops face a continuing battle against unwanted tree growth. Historically, trees have been killed by cutting and removal of small trees or by girdling in the case of large trees. Such cutting or girdling is slow and energy intensive but if carefully done will result in the death of each tree selected. More recently the use of chemical sprays and poisons have been used with varying degrees of success. With chemical spraying not every tree selected will be killed and often trees and plants are killed which were not intended to be. The chemicals are always somewhat non-specific in their killing and are a source of potentially dangerous pollution. Most chemical sprays are derived from increasingly scarce petroleum and are also becoming relatively expensive.

By the present invention an electronic apparatus is provided for killing unwanted trees which utilizes no chemicals and which requires no physical cutting or removal or any portion of the plant structure. From the previous practices such as girdling large trees it is known that if certain cells of the tree are destroyed or devitalized in a circumferential band only about an inch or less in width that the tree will soon die. The apparatus of the present invention utilizes an electronic heating effect to devitalize a band of cells around the tree. It is believed that the cambium cells of the tree are particularly sensitive and that it is primarily their devitalization that is responsible for the death of the plant. Only a moderate elevation in temperature is required for devitalization of the cambium cells, for example if the cambium cells are heated to over 100° C. for a few seconds they are rendered lifeless. It should be understood that while the explanations of the theory of the operation of the apparatus presented here are believed to be correct the effectiveness of the apparatus is dependent upon the actual operation of the apparatus in practice rather than upon the theory of operation presented here. Thus other unappreciated phenomena may contribute to a greater or lesser extent to the operation of the apparatus in addition to the devitalization of the cambium cells.

In addition to providing the objects and advantages described above, it is an object of the present invention to provide apparatus for subjecting a portion of a stem of a large plant to radio-frequency field to cause heating or other effects devitalizing certain cells of the plant to cause its death.

It is another object of the present invention to provide apparatus for generating a radio-frequency emission and transmitting it to a localized portion of a plant stem with an intensity and time duration sufficient to raise the temperature of certain cells of the plant to cause their death and the ultimate death of the plant itself or a portion thereof.

It is still another object of the present invention to provide apparatus for generating a radio-frequency emission and transmitting it to a conductor generally encircling the stem of a large plant to cause induction and/or dielectric heating of a selected portion of the plant to a degree to cause death of the plant or a portion thereof.

It is still another object of the present invention to provide electronic silvicidal apparatus for subjecting a portion of a large plant to a radio-frequency field which includes flexible conductors which are wrapped around the stem of the plant by an actuator mechanism thereby placing the conductors so that an intense electrical field is produced in a band encircling the stem of the plant.

Other objects and advantages will be apparent from consideration of the following description in conjunction with the appended drawings in which:

FIG. 1 is a schematic illustration of an electronic silvicidal apparatus in position on a plant stem;

FIG. 2 is an elevational view of a silvicidal apparatus according to the present invention;

FIG. 3 is a plan view partially cut away showing the portable clamp unit of the apparatus of FIG. 2 in place around a tree trunk;

FIG. 4 is an enlarged sectional view of the apparatus of FIG. 3 taken along the line 4—4 in FIG. 3.

Figure 5:
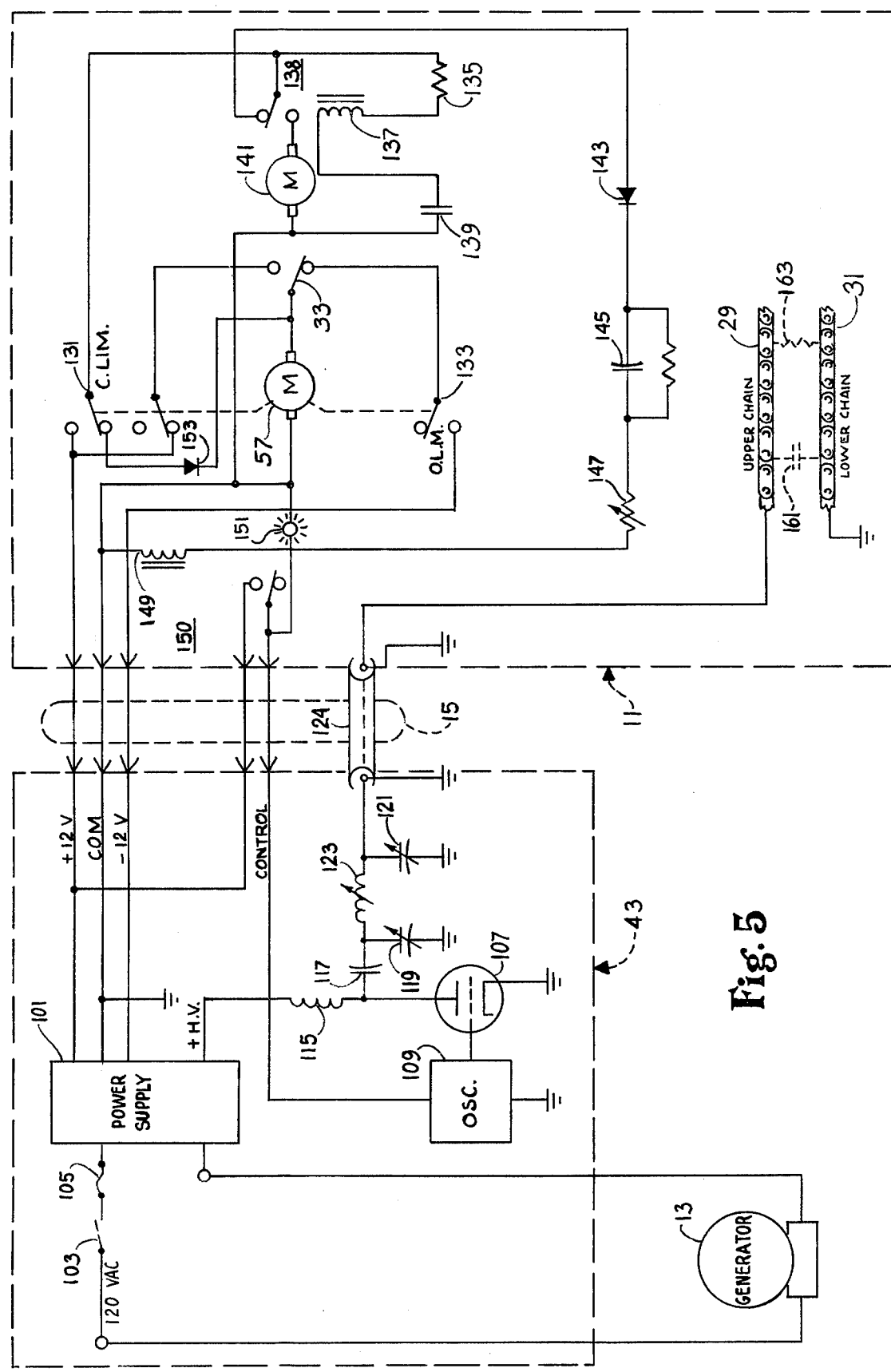
FIG. 5 is a schematic circuit diagram of an electronic circuit for the apparatus of FIGS. 2-4.

As shown in FIG. 1 the organic structure of a tree trunk or stem includes bark 1 overlying a cambium layer 2, and, of course, the bulk of the tree trunk consists of woody fiber 3.

Cambium cells of the cambium layer 2 are those that carry water, food stuffs, and vital fluids between the roots and leaves of the plant and are found to be virtually essential for the life of the tree. The cambium layer 2 is relatively high in moisture compared with the woody trunk 3 and the bark 1. Those cells of a plant containing water are relatively easily heated by a radio-frequency field. In contrast the woody trunk 3 and the bark 1 being relatively low in moisture have neither the conductivity for inductive heating nor the dielectric losses for dielectric heating which would cause them to absorb energy from the electrical field in a degree comparable to the absorption of the cambium layer.

As seen in FIG. 1 a first conductor 4 and a second conductor 5 encircle the bark layer 1. A radio-frequency generator 6 is a source of radio-frequency energy which is connected to conductors 4 and 5 and creates an electrical field 7 therebetween. Some portion of the electrical field 7 will be absorbed and a highly disportionate portion of this absorption will take place in the cambium layer 2. The electrical field 7 will be predominantly confined to the region between conductors 4 and 5 and hence there will be very effective energy transfer from the radio-frequency source 6 to the cambium layer 2 in a band surrounding the tree trunk.

The cambium cells, having a higher moisture content, will more readily absorb the radio-frequency energy and thus be heated to a higher temperature more rapidly than the bark 1 or the wood trunk 3. In other words, the energy is delivered from the generator 6 through the bark 2 with only slight attenuation and it is to a very large degree absorbed in the cambium layer 2. From an operational standpoint this silvicidal technique enables the tree to be killed by delivering only the modest amount of energy necessary to destroy the functioning of a small volume of cambium layer cells 2 without physically removing, oxidizing or significantly heating the bark 1, which may be of substantial thickness (a large fraction of an inch or more). By way of example, considering a hardwood tree of approximately six inches in diameter the radio-frequency power supplied by the generator 6 may be from 100 Watts to 10 Kilowatts and it may be applied for a period from one second to twenty seconds. Typically a power of 1 Kilowatt for ten seconds may be applied. As a practical matter a generous dose of energy will likely be used since the energy required and its cost is relatively insignificant. As will later be seen the radio-frequency source is controlled to operate only when needed and if portable electric generator power is used the load duty cycle for such generator may be very low.

A practical embodiment of the apparatus for carrying out the invention is illustrated in FIGS. 2, 3 and 4. The apparatus includes a hand held clamp element 11 and a power unit 13 (typically gasoline engine powered) which is connected to the clamp element 11 by an electrical cable 15. Power unit 13 includes gasoline engine 41, generator 42 and electronic power supply package 43 connected to generator 42 by cable 45. The clamp element 11 is provided with a housing 19 and includes a top handle 21 and a rear handle 23. At the forward end of the clamp element 11 are a pair of jaws 25 and 27, 25 being a fixed jaw and 27 being a movable jaw. A trigger 12 in rear handle 23 controls the actuators for clamping a conductor 29 and a conductor 31 around a tree trunk 17.

The mechanism of clamp element 11 includes a pivot pin 51 securing jaw 27 for pivotal movement with respect to housing 19. A spur gear 53 is secured to or formed integrally with jaw 27 and mates with a worm gear 55 mounted on shaft 56 of reversible electric gear motor 57. Thus movable jaw 27 may be opened and closed through about 90° by energization of motor 57 to run in either the forward or reverse direction. Motor shaft 56 may run at 500 r.p.m. Conductors 29 and 31 are shown in the form of lengths of metal sprocket chain. They are separated from and hence insulated from one another. The jaws 27 may be formed of metal in which case at least one of conductors 29 and 31 is insulated from jaw 27. Attachment block 28 (FIG. 4) is of insulating material such as plastic.

It should be understood that the sprocket chain shown in FIGS. 3 and 4 is only one illustration of a flexible conductor that may be utilized for conductors 29 and 31. Alternatively conductors 29 and 31 could be stranded copper wire conductors secured to or imbedded in a single flexible rubber belt. The conductors may be shielded by use of a belt with a center conductor on the inside and a wire mesh along the edges and back side as an outer conductor (which would be grounded). Other alternative arrangements will be apparent to skilled mechanics. A main consideration for conductors 29 and 31 is that they be arranged to be flexible in the horizontal plane but relatively inflexible in the vertical direction so that they can be conveniently wrapped around the tree trunk 17 and a uniform separation will be maintained between conductors 29 and 31. Insulating separator rods may be connected between chains 29 and 31 to maintain uniform spacing therebetween, if desired.

Each conductor 29 and 31 is engaged by a sprocket 61 and 63, respectively. Sprockets 61 and 63 are driven through a double ended angle gear box 65. Gear box 65 may conveniently have a reduction of from 10/1 to 20/1. Sprocket 61 is insulated or non-conductive. The input to gear box 65 is a flexible shaft 67 connected to the output shaft 69 of a reversible electric motor 71 mounted fixedly in housing 19. Shaft 69 may rotate at about 2000 r.p.m.

Fixed jaw 25 is preferably hollow and the free end of conductors 29 and 31 run from driven sprockets 61 and 63 through guides 62 and 64 over idlers 72 and 82 to storage reels 73 and 74, which are lightly spring loaded (by a coil spring not shown) to take up the slack in conductors 29 and 31 as they are drawn tight around tree trunk 17 by the action of sprockets 61 and 63. Clamp elements 11 may obviously be built in different sizes to accommodate different sizes of tree trunks and clamp elements of different sizes may be used interchangeably with the same generator unit by the expedient of providing plug connections on cable 15. By way of example, a clamp unit may be built to use with plants having stem diameters from one to ten inches. A larger clamp element might be built to utilize with plants having stems from six to 18 inches.

Alternatively only that portion of conductor 29 (or 31) which runs over sprocket 61 (or 63) need be formed of sprocket chain. For a less bulky arrangement the end of each sprocket chain may be connected by a flexible steel tape to storage reels 73 or 74. The tape may have a length just less than the distance between sprocket 61 and storage reel 73. As shown in FIG. 3 electrical contact 81 is mounted on an insulating block 85 to make sliding contact with chain 29 from the r.f. cable (not shown in FIG. 3). A similar contact may be provided for chain 31. Alternatively the r.f. electrical connection to conductors 29 and 31 may be made either at their ends secured to jaw 27 or through sprocket 61 and 63. Chain 29 is insulated from the remainder of clamp element 11; chain 31 may be grounded with the frame of clamp element 11. In any case the connection for RF energy is preferably made through a shielded co-axial cable and suitable connectors through housing 19 and cable 15 to radio-frequency generator 43 to minimize unwanted emissions.

The apparatus disclosed and the description of it assumes that it will be most practical to use two (or more) conductors 29 and 31 of similar structure encircling the trunk 17. It should be noted that this is not necessarily the only possible arrangement since a tree trunk may often be sufficiently well-grounded so that it is theoretically possible and perhaps practical to employ only a single conductor such as 29 and rely upon a ground return path to radio-frequency generator 43. It is believed, however, that in some cases such a ground return path could unacceptably increase the level of unwanted radio-frequency emission that might tend to produce interference to radio communication systems and the like.

Electronic package 75 within the clamp element 11 contains the electronic control devices to drive clamp motor 57, chain motor 71, and produce the preset radiation interval. The electrical schematic of FIG. 5 shows the electrical circuitry of power supply package 43 and control package 75 located on the generator skid 47 and in clamp unit 11, respectively. The output of generator 42 is supplied to a power supply 101 through switch 103, and fuse 105. The conventional power supply 101 converts the a.c. power (230 V, 60 Hz, for example) of the generator 13 to ±12 VDC for control and actuation of the clamp element 11 and to the d.c. high voltage (HV) required by the power amplifier tube 107, typically several hundred volts. An oscillator circuit 109 may be a solid state oscillator at the industrial heating frequency allocation of 27 MHz. It is energized from the +12 V. line from power supply 101 upon closing of contacts of relay 150. Oscillator 109 drives the grid of tube 107 which amplifies the low power output of the oscillator to a high power level sufficient to quickly heat a selected portion of a tree causing its death. A choke 115 supplies the +HV to the plate of tube 107, but blocks the power supply from the r.f. output of the tube 107. Capacitor 117 blocks the +HV but passes the r.f. output of tube 107 to a pi impedance matching network comprising variable capacitors 119 and 121 and variable inductor 123. This pi network matches the high impedance output of the tube 107 to the low impedance of r.f. cable 124 and chains 29 and 31 as loaded by a section of tree 17. The impedance matching function of the pi network may be optimized in a conventional manner to suit any given load impedance of chains 29 and 31 and tree 17 by adjusting of capacitors 119, 121 and coil 123.

Clamp motor 57 is a reversible permanent magnet gear motor which through shaft 56 and external gears 53 and 55 drives and positions clamp jaw 27. A limit switch 133 is located to be actuated when clamp jaw 27 is fully open. Double throw trigger switch 33 is actuated by the operator pulling or releasing trigger 12. In FIG. 5 the switches are shown with the trigger 12 released or in the open position indicating that the clamp jaw 27 should be open. Upon the operator's pulling the trigger 12 and putting the trigger switch 33 in its "close" (upper) position current flows from the common of power supply 101 through clamp motor 57 (causing it to rotate in the direction which closes clamp jaw 27), through the closed contact of trigger switch 33 and through the lowest, closed contacts of the closed limit switch 131 (which has not yet been actuated by clamp jaw 27). As clamp jaw 27 moves into its fully closed position, limit switch 131 is actuated to interrupt the flow of current to and stop motor 57.

When the upper contacts of switch 131 close current flows through resistor 135, coil 137 of relay 138, and capacitor 139, causing the lower contacts of relay 138 to close and so remain as long as sufficient current flows in capacitor 139, which, with resistor 135, operates to close open relay 138 for a predetermined time interval. This interval is selected to allow ample time for chain motor 141 to tighten chains 29 and 31 around tree 17 and then hold without further rotation. As long as the lower contacts of relay 138 are closed, current flows from switch 131 upper contacts through relay 138 lower contacts, through the chain motor 141 and back to the power supply common. Motor 141 is selected to withstand the short stall periods encountered after chains 29 and 31 are tightened.

At the end of the chain retract interval the upper contacts of relay 138 close allowing current to now flow through diode 143, capacitor 145, resistors 146 and 147, and through coil 149 of relay 150 back to the common of the power supply 101. Capacitor 145 and resistor 147 serve to energize relay 150 for an interval called the radiation interval. Resistor 146 is a bleed discharge resistor. As long as the contacts of relay 150 are closed the oscillator 109 receives power. Resistor 147 may be adjusted manually to vary the radiation interval. Alternatively the variable resistor 147 may be mechanically coupled to chain motor 141 or reel 74 to provide longer radiation intervals for larger diameter trees. Indicator lamp 151 lights when oscillator 109 is operating and extinguishes when relay 150 drops out and oscillator 109 is turned off. Preferably tube 107 is biased to cutoff when oscillator 109 is deactivated to conserve energy.

When the operator releases trigger 12 at the end of the radiation interval, the lower contacts of switch 33 close passing a current through clamp motor 57 in the opposite direction as for the closing actuation and through the contacts of switch 133 which are now closed. Clamp motor 57 continues to open clamp jaw 27 until it is fully opened and switch 133 is again actuated interrupting the current through clamp motor 57. When current is supplied through switch 33 to operate motor 57, a current is also supplied through diode 153, switch 131, resistor 135, capacitor 139 and coil 137 of relay 138, which closes its lower contacts to pass current through chain motor 141 in the opposite direction as the first instance thereby extending chains 29 and 31. When the chain extend interval is over and the upper contacts of relay 138 close, diode 143 now prevents a second radiation interval. The upper and lower chains 29 and 31 are shown in FIG. 5 along with the apparent capacitance 161 and apparent resistance 163 presented to the r.f. circuit by the presence of the tree 17. It is primarily in this apparent resistance 163 that heat is generated and therein that the temperature is increased destroying the functioning of that portion of the tree.

Operation of the apparatus is quite straightforward. The operator places the open clamp element against a tree trunk, usually at as low a level as convenient, and presses trigger 12. All further operations are automatic as described above and when indicator lamp 151 extinguishes the operator releases trigger 12 to cause the clamp element to open and removes it from the tree trunk. If the trigger is released before completion of the cycle the clamp will open to the ready position.

Electronic package 43 is shielded to prevent unwanted radio-frequency emissions and, of course, r.f. cable 124 is likewise shielded. Radio-frequency emissions are accordingly substantially eliminated except those from chain conductors 29 and 31. As previously mentioned a arrangement may be substituted for chains 29 and 31 to better shield unwanted emissions from that source. The operator's body may also be shielded from radio-frequency emissions by a conductive vertical screen mounted between jaws 25 and 27 and handle 21, if desired. It should be noted however that the radio-frequency emissions from the apparatus are readily reduced to a non-hazardous level and one which produces little or no interference to radio communication. Even though fairly large powers may be produced in some instances, such power is very largely absorbed in the tree trunk and a very small portion is radiated. This small portion may be further reduced by use of shielded conductor elements as described above. The frequency of the apparatus may be set in the industrial heating band at 27 MHz and thus it is not comparable to the shorter, potentially hazardous microwaves present in microwave ovens. The nature of 27 MHz radiation is substantially the same as the nearby frequencies used for citizens band hand-held radio transmitters which are accepted to be non-hazardous.

For convenience of illustration and inherent simplicity the controls shown for the apparatus are analog electro-mechanical controls. It is apparent that the same functions could be carried out with digital and/or solid state techniques. The specific values of voltages and power and specific circuits and components are, of course, only exemplary and any alternative values, circuits or components may equally well be employed.

In addition to variations and modifications to the apparatus shown and suggested above, other variations and modifications will be apparent to those skilled in the art and accordingly the scope of the invention is not to be deemed limited to those embodiments shown or suggested but is rather to be determined by reference to the appended claims.

What is claimed is:

1. Electronic silvicidal apparatus comprising
a source of radio-frequency power,
first electrically conductive means for establishing a radio-frequency connection to the stem of a living plant,
second separate electrically conductive means for establishing a radio-frequency connection to the stem of said plant, said second means being adapted to provide a radio-frequency energy path into the stem of said plant which substantially encircles said stem,
and third means for controllably conveying radio-frequency power from said radio-frequency power source to said first means and said second means,
whereby radio-frequency energy may be made to flow from said second means into said stem to heat and devitalize at least the cambium cell layers of said stem in a band surrounding said stem.

2. Apparatus as recited in claim 1 wherein said source produces an electrical emission primarily at a frequency between 10 Kilohertz and 30 Gigahertz.

3. Apparatus as recited in claim 1 wherein said third means includes a two-conductor radio-frequency transmission line.

4. Electronic silvicidal apparatus comprising
a source of radio-frequency power,
first electrically conductive means for establishing a radio-frequency connection to the stem of a living plant, p1 second separate electrically conductive means for establishing a radio-frequency connection to the stem of said plant, said second means including a flexible conductor adapted to at least partially encircle and engage with said stem and said second means being adapted to provide a radio-frequency energy path into the stem of said plant which substantially encircles said stem,
and third means for controllably conveying radio-frequency power from said radio-frequency power source to said first means and said second means,
whereby radio-frequency energy may be made to flow from said second means into said stem to heat and devitalize at least the cambium cell layers of said stem in a band surrounding said stem.

5. Apparatus as recited in claim 4 further including an actuator for engaging and disengaging said flexible conductor from encirclement of a plant stem.

6. Apparatus as recited in claim 5 further including a motor for retracting a portion of said flexible conductor to bring it into close proximity with the surface of said plant stem.

7. Apparatus as recited in claim 5 wherein said actuator includes a pair of jaws, at least one of which is movable, has an end of said flexible conductor connected thereto, and is driven by a reversible electric motor.

8. Apparatus as recited in claim 4 wherein said first means includes a flexible conductor adapted to at least partially encircle and engage with said stem.

9. Electronic silvicidal apparatus comprising
a source of radio-frequency power,
first electrically conductive means for establishing a radio-frequency connection to the stem of a living plant,
second separate electrically conductive means including a flexible conductor for establishing a radio-frequency connection to the stem of said plant, said second means being adapted to provide a radio-frequency energy path into the stem of said plant which substantially encircles said stem,
and third means including a two-conductor radio-frequency transmission line for controllably conveying power from said radio-frequency power source to said first means and said second means,
whereby radio-frequency power may be made to flow from said second means into said stem to heat and devitalize at least the cambium cell layers of said stem in a band surrounding said stem.

10. Apparatus as recited in claim 9 further including an actuator for engaging and disengaging said flexible conductor from encirclement of a plant stem.

11. Apparatus as recited in claim 9 wherein said first means includes a flexible conductor adapted to at least partially encircle and engage with said stem.

12. Apparatus as recited in claim 9 further including a motor for retracting a portion of said flexible conductor to bring it into close proximity with the surface of said plant stem.

* * * * *